Nov. 1, 1966 B. E. PATRUSKY 3,283,306

INFORMATION HANDLING APPARATUS INCLUDING TIME SHARING OF PLURAL ADDRESSABLE PERIPHERAL DEVICE TRANSFER CHANNELS

Filed Nov. 26, 1962 3 Sheets-Sheet 1

INVENTOR.
BERNARD E. PATRUSKY
BY
Carl V. Olson
ATTORNEY

INVENTOR
BERNARD E. PATRUSKY
BY
Carl V. Olson
ATTORNEY

Nov. 1, 1966 B. E. PATRUSKY 3,283,306

INFORMATION HANDLING APPARATUS INCLUDING TIME SHARING OF PLURAL ADDRESSABLE PERIPHERAL DEVICE TRANSFER CHANNELS

Filed Nov. 26, 1962 3 Sheets-Sheet 3

INVENTOR.
BERNARD E. PATRUSKY
BY
Carl V. Olson
ATTORNEY 3,283,306

INFORMATION HANDLING APPARATUS INCLUDING TIME SHARING OF PLURAL ADDRESSABLE PERIPHERAL DEVICE TRANSFER CHANNELS

Bernard E. Patrusky, Philadelphia, Pa., assignor to Radio Corporation of America, a corporation of Delaware
Filed Nov. 26, 1962, Ser. No. 239,920
12 Claims. (Cl. 340—172.5)

This invention relates to information handling apparatus, and particularly to means providing communication between a data processor and a plurality of peripheral input and output devices such as tape stations, magnetic drums, printers, card equipment, and communication channels.

The data processor of a computer or data processing apparatus is normally capable of very high speed operation in the handling of data, compared with the speed at which peripheral input-output devices are capable of supplying or receiving data. Therefore, the data processor can proceed with its stored program during intervals between the transfer of successive data words to or from a peripheral device in a time sharing fashion.

The time sharing operation of the data processor and a large number of peripheral devices normally requires an elabroate system of control, in order that equipments will be operated in accordance with a priority scheme, and in such a way as to avoid the loss of data and to avoid unnecessary idleness of equipments. A plurality of similar peripheral devices, such as tape stations, may be grouped for connection one at a time through a single transfer channel or buffer to the data processor. The control system includes an interrogation and decision making portion at the central location of the data processor, demand and availability portions at each transfer channel, and an appropriately large number of control conductors between the central location and the transfer channels.

It is a general object of this invention to provide an improved system for the time sharing operation of a data processor and a plurality of peripheral devices.

It is a more specific object to provide a time sharing system for the operation of a central data processor and a plurality of remote peripheral devices which is characterized in having fewer of circuits and interconnecting conductors than previous similar systems.

In accordance with an example of the invention, pluralities of similar peripheral devices (such as tape stations, magnetic drums, card equipments, etc.) are each provided with a transfer channel or buffer. All the transfer channels are connected over a signal bus, which may include a data bus and a control bus, to a centrally-located data processor. A transfer channel selector and coder means associated with the data processor has individual inputs for a plurality of transfer channels and has an output for a coded transfer channel number signal corresponding to the highest priority one of its inputs. Each transfer channel includes a first individual transfer channel number signal decoder having an input coupled over said signal bus to said data processor, an operational readiness indicating means, and operational readiness gate means. The operational readiness gate means in each transfer channel is responsive to the operational readiness indicating means therein and to the output of the first transfer channel number signal decoder therein to supply a number signal over a respective "ready" line to an input of the selector and coder means. A transfer channel address line couples the output of the selector and coder means to a second number signal decoder in each and every one of the transfer channels. Information transferring gates in each transfer channel are selectively enabled by the output of the respective second number signal decoder therein to permit communication over the signal bus between the transfer channel and the data processor. The transfer channel number signal on the transfer channel address line is also applied to the data processor to program the information words transferred between the data processor and the selected transfer channel.

The invention will be described in greater detail in connection with the accompanying drawing wherein.

*Description*

Figure 1A:
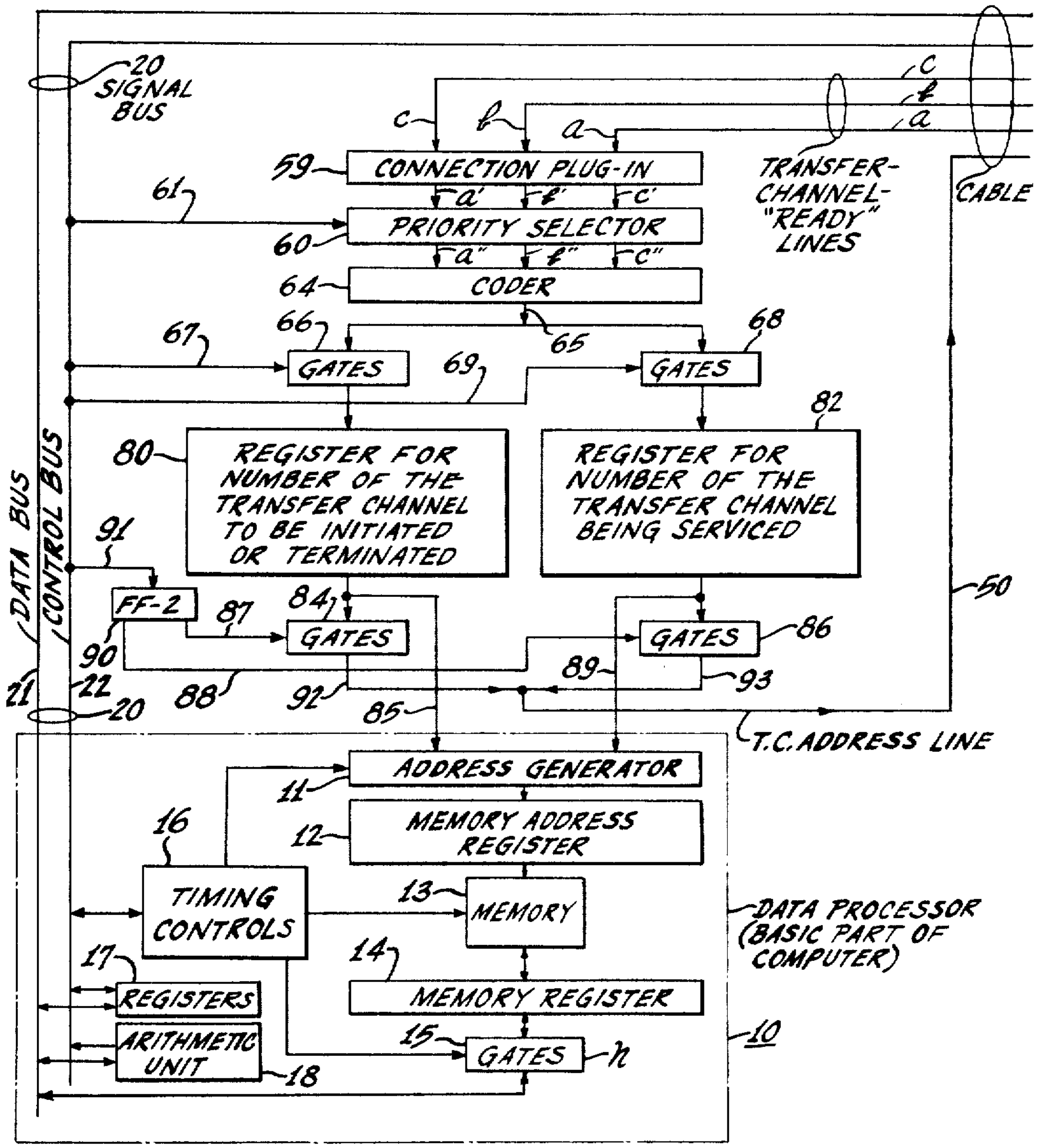
FIGURE 1A is a diagram of a centrally-located data processor and circuits for the time sharing control of the data processor and remotely-located peripheral devices.
Figure 1A:
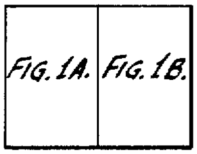

FIGURE 1A includes a simplified block diagram of a data processor 10 which is the basic computing part of a data processing apparatus. The data processor 10 includes the usual arrangement of an address generator 11, a memory address register 12, a memory 13, a memory register 14, gates 15, timing controls 16, registers 17 and an arithmetic unit 18. The data processor is connected to other parts of the system by means of a multiconductor signal bus 20 which may include a multiconductor data bus 21 and a multi-conductor control bus 22. The buses extend to FIGURE 1B (which matches side by side with FIGURE 1A), where the data bus 21 is connected over branching data buses 21A, 21B and 21C to transfer channels A, B and C, respectively. The control bus 22 is connected over branching control buses 22A, 22B and 22C to transfer channels A, B and C, respectively.

The three illustrated transfer channels A, B and C are illustrative of a larger number of transfer channels (also known as buffers) in a data processing apparatus. Transfer channels B and C, and others, include the same circuits which are illustrated solely in transfer channel A. Each transfer channel may serve as a buffer for a plurality of similar peripheral devices, which may be magnetic tape stations, magnetic drums, printers, card equipment, communication channels, etc.

Transfer channel A is connected through a switch 24A to a plurality 25A of peripheral devices which may be tape stations, for example. Transfer channel B is connected through a switch 24B to a plurality 25B of similar peripheral devices which may be magnetic drums, and transfer channel C is connected through a switch 24C to a plurality of similar peripheral devices 25C which may be printers, for example. Switches 24 and peripheral devices 25 associated with a single transfer channel are arranged so that only one peripheral device associated with the transfer channel is operative at a time.

The circuits illustrated in transfer channel A are also present in transfer channels B and C. The data bus branch 21A in transfer channel A is connected over lead 28 to the input of a first transfer channel number signal decoder or initiation request decoder 26. Each transfer channel is assigned an individual number. If there are 16 transfer channels, four conductors, each carrying a "1" or a "0" binary signal, are required to identify the 16 transfer channels. The input lead 28 to the decoder 26 then consists of four conductors connected through four conductors of the branch data bus 21A to four conductors of the data bus 21. The first decoder 26 in each transfer channel responds solely to number signals which correspond with its assigned transfer channel number. The decoder 26 may be of any conventional design and may consist of gates so interconnected that they produce an output solely in response to signals simultaneously present on certain ones of the conductors of line 28.

The decoder 26 provides an output over line 29 to a ready-for-initiation gate 30. The gate 30, which may be a conventional "and" gate, also has an input over line 32 which constitutes at least one of the conductors of the branch control bus 22A and the control bus 22. The ready-for-initiation gate 30 also has an input on line 34 from conventional circuits (not shown) in the transfer channel which provide a signal when the transfer channel is idle and is in condition to be energized and utilized. The gate 30 has an output line 36 connected to the set input of a flip-flop 38.

A ready-for-service gate 40 has an input 41 from a conductor of the branch control bus 22A and has another input 42 from conventional circuits (not shown) in the transfer channel which provide a signal when the transfer channel is ready for the transfer of at least one data word. The ready-for-service gate 40 may be a conventional "and" gate and it has an output connected over the line 36 also to the set input of flip-flop 38.

A ready-for-termination gate 44 has an input over line 45 from the branching control bus 22A and has another input 46 from conventional circuits (not shown) in the transfer channel which provide a signal when the transfer channel has finished transferring data and is ready for a termination routine. The ready-for-termination gate 44 similarly may be a conventional "and" gate and it has an output coupled over line 36 to the set input of flip-flop 38. The output of the flip-flop 38 is connected over a transfer channel "ready" line *a* to the centrally-located circuits shown in FIGURE 1A. There is a "ready" line *a*, *b* and *c* from each respective one of the transfer channels A, B and C.

Gates 30, 40 and 44 can be viewed as operational readiness means wherein gates 30 and 44 are ready-to-be-controlled means and gate 40 is a ready-for-data-transfer means.

A transfer channel address line 50 from the centrally-located circuits of FIGURE 1A is connected to a second transfer channel number decoder 52 in transfer channel A, and is connected also to similar but distinctive decoders in the other transfer channels B and C. The address line may consist of four conductors if there are not more than sixteen transfer channels. The transfer channel number decoder 52 performs the same decoding function performed by the initiation transfer number decoder 26. Both decoders, which may be conventional, are circuits for receiving a binary coded number signal on a plurality of input conductors and for energizing an output line solely when the input number signal corresponds with the number assigned to the particular transfer channel. The decoder 52 has an output on line 54 which is applied to enabling inputs of gates 56 and 58. When enabled, gates 56 and 58 permit the passage in both directions of control and data word signals over branch control bus 22A and branch data bus 21A. The gates 56 and 58 thus control the passage of information signals between the control and data buses 22, 21 and circuits (not shown) in the transfer channel, some of which are connected in the usual manner through switch 24 to the peripheral devices 25 associated with the particular transfer channel.

Figure 1B:
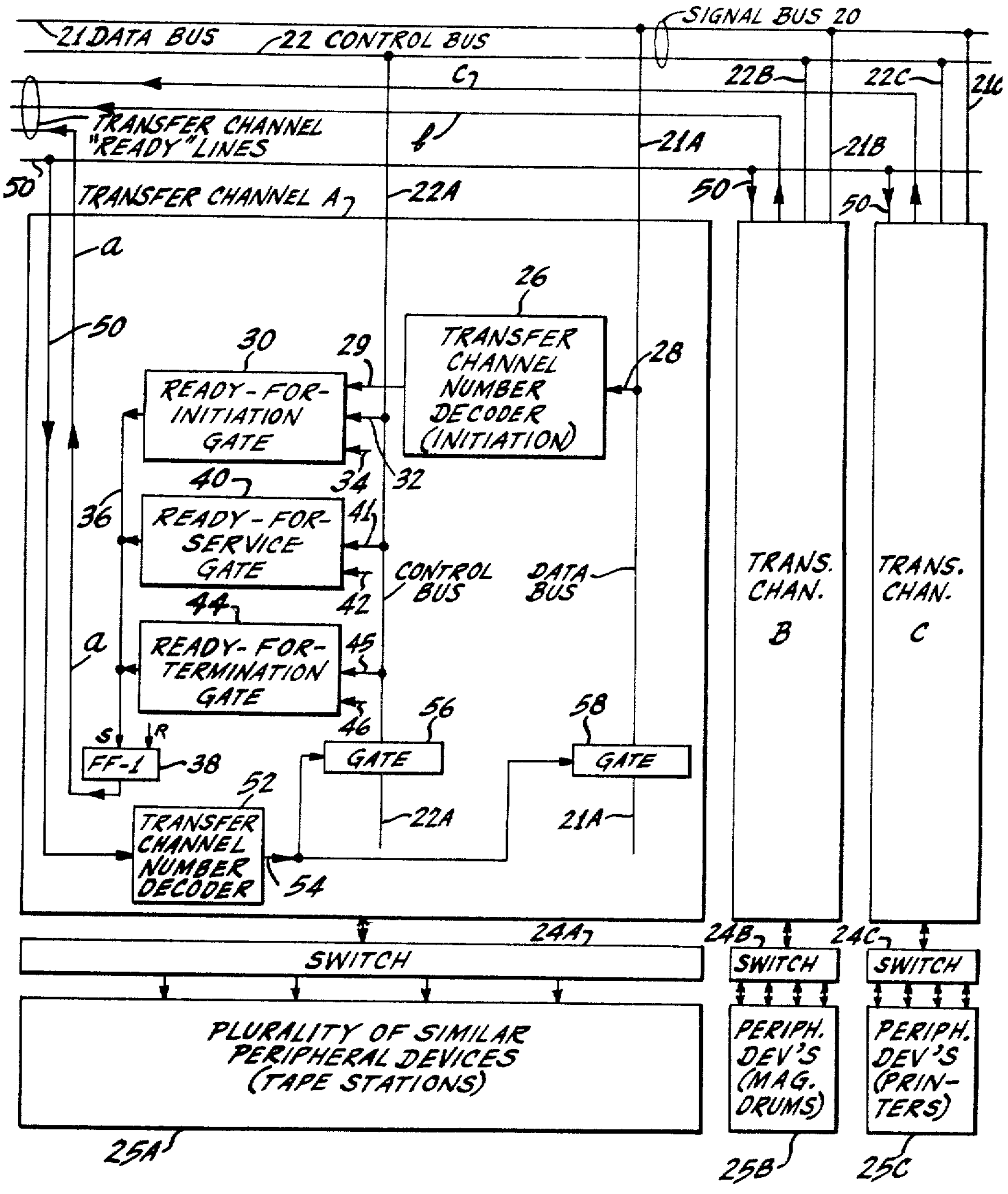
FIGURE 1B is a diagram of remotely-located transfer channels and associated peripheral devices which are connected by means of cables to the centrally-located equipments of FIGURE 1A.

Referring now to FIGURE 1A, the transfer channel "ready" lines *a*, *b* and *c* from the transfer channels of FIGURE 1B are connected to respective inputs of a connection plug-in board 59 having a corresponding number of outputs *a'*, *b'* and *c'*. The purpose of the connection plug-in is to provide an easily changed connection scheme between the "ready" lines *a*, *b* and *c* from the transfer channels and the input to a priority scanner or selector 60. The plug-in 59 is useful when setting up or changing the complement of transfer channels used with a particular centrally-located data processor. In the present example, the plug-in 59 connects inputs *a*, *b* and *c* to outputs *a'*, *b'* and *c'*, respectively, based on the assumption that transfer channels A, B and C have speed or operational priorities in that order.

Figure 3:
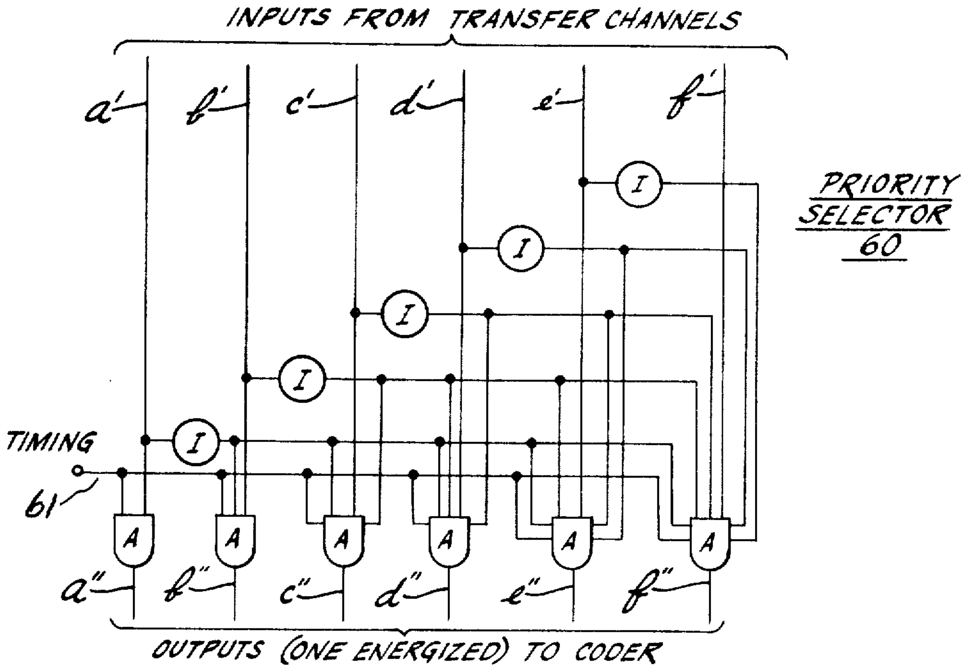
FIGURE 3 is a diagram of a priority selector useful in the system of FIGURE 1A.

The priority selector 60 may be a circuit such as is shown in FIGURE 3 which illustrates a selector having six inputs *a'* through *f'* from six transfer channels. The inputs are connected through respective "and" gates A to respective output lines *a''* through *f''*. A timing pulse line 61 conveys timing pulses from the control bus 22 to an input of each of the "and" gates A. Each of the plurality of inverters I inverts the signal on a respective one of the input lines *a'* through *e'* and conveys it to inputs of all succeeding "and" gates A.

If inputs to the priority selector are present on all of the input lines *a'* to *f'*, an output will appear solely on the output line *a''* because all of the succeeding "and" gates A are inhibited. To give another example, if inputs are present on input lines *c'*, *d'* and *e'*, an output will be present solely on output line *c''* because the "and" gates in lines *a*, *b* and *f* are not energized from an input, and the "and" gates in lines *d* and *e* are inhibited. To summarize, the priority selector provides an output on the one of its output lines which corresponds with the highest priority one of its input lines, which, in turn, corresponds with the highest priority one of the transfer channels supplying an input to the selector.

Returning now to FIGURE 1A, the output of priority selector 60 is coupled to the input of a coder 64 which translates or encodes an input on one of its input lines (which corresponds to the highest priority transfer channel) to a corresponding binary coded number signal on its output line 65. If there are 16 transfer channels, the line 65 will have at least four conductors, one for each of the binary bits necessary to represent the 16 different transfer channels. The coder 64 may be any conventional known coder such as one constructed of a grid of conductors and appropriately connected "and" gates.

The output of coder 64 is applied in parallel to inputs of gates 66 which are enabled by a timing pulse applied over line 67 from the control bus 22, and to gates 68 which are enabled by a timing pulse applied over the line 69 and the control bus 22 from the timing control unit 16.

The output of the gates 66 is applied to a register 80 for the number of the transfer channel to be initiated or terminated. The output of gates 68 is connected to a register 82 for the number of the transfer channel being serviced. Registers 80 and 82 may be conventional known circuits, which usually include flip-flops for each binary bit to be stored therein. The outputs of registers 80 and 82 are connected through respective gates 84 and 86 which are alternatively enabled over respective lines 87 and 88 from two respective outputs of a triggerable flip-flop 90. The flip-flop 90 is triggered by a timing pulse over the line 91 from the control bus 22. The outputs 92 and 93 of the respective gates 84 and 86 carry signals at non-overlapping times and are both connected to the transfer channel address line 50. The gates 84 and 86 and the flip-flop 90 may be of conventional known construction.

*Operation*

The operation of the time sharing system of FIGURES 1A and 1B will now be described. It is assumed that the data processor is occupied with the performance of its normal internal program, as represented by the bar 95 in the time chart of FIGURE 2. It is then assumed that the normal program reaches an input/output instruction requiring communication through a transfer channel with a peripheral device. This results in the initiation of a signal in a register 17 of the data processor which is directed over the data bus 21 as a binary number signal on a plurality of conductors. The conductors of the data bus 21 are connected through the branch data buses 21A, 21B and 21C and through the leads 28 to the transfer channel number decoder 26 in each and every one of the transfer channels A, B and C. If the number signal corresponds with the number assigned to transfer channel A, solely the decoder 28 in transfer channel A will respond and supply a signal over line 29 to the ready-for-initiation gate 30. If the transfer channel A is idle and in condition for initiation, as evidenced by a signal on input 34 to the gate 30, the next occurring timing pulse applied to input 32 over branch control bus 22A will result in the enabling of gate 30 and the application of a signal over line 36 to the set input of flip-flop 38. The "ready" line *a* at the output of flip-flop 38 is thus energized to apply a signal through the connection plug-in 59 to the priority selector 60.

Since the only input to the priority selector 60 is on input line *a'*, the selector automatically conveys the signal on input line *a'* to the output line *a''* leading to the coder 64. The coder 64 provides an output on line 65 which is a binary signal representation of the number assigned to transfer channel A. A timing pulse then is applied from the control bus 22 over the lead 67 to enable the gates 66, so that the binary number signal is transferred to the register 80 for the number of the transfer channel to be initiated or terminated. The initiation of a transfer channel is a programmed procedure by which the transfer channel is made ready for the transfer of data. The termination of a transfer channel is a reverse procedure.

A timing pulse applied from the control bus 22 over the lead 91 triggers the flip-flop 90 so that it applies a signal over line 87 which enables gates 84. The signal representing the number of the transfer channel is then conveyed over line 92 to the transfer channel address line 50.

The signal on address line 50 represents the number of the transfer channel with which the data processor has indicated a desire to communicate and which has reported itself to be ready for initiation. The signal is applied over the transfer channel address line 50 to the transfer channel number decoders 52 in all of the transfer channels. Solely the decoder 52 in transfer channel A responds to the signal and enables the gates 56 and 58 to permit communication of information words between the transfer channel A and the data processor 10 over signal bus 20 (the control bus 22 and/or the data bus 21). The information words which are actually transferred are programmed by the data processor 10 as the result of the number signal directed also to data processor 10 over line 85 from the register 80. Thus, the address generated by address generator 11 in response to the number signal from register 80 may designate the location in memory of the first one of a subroutine of processor instructions used in transferring a word between an external device and the processor memory 13.

Figure 2:
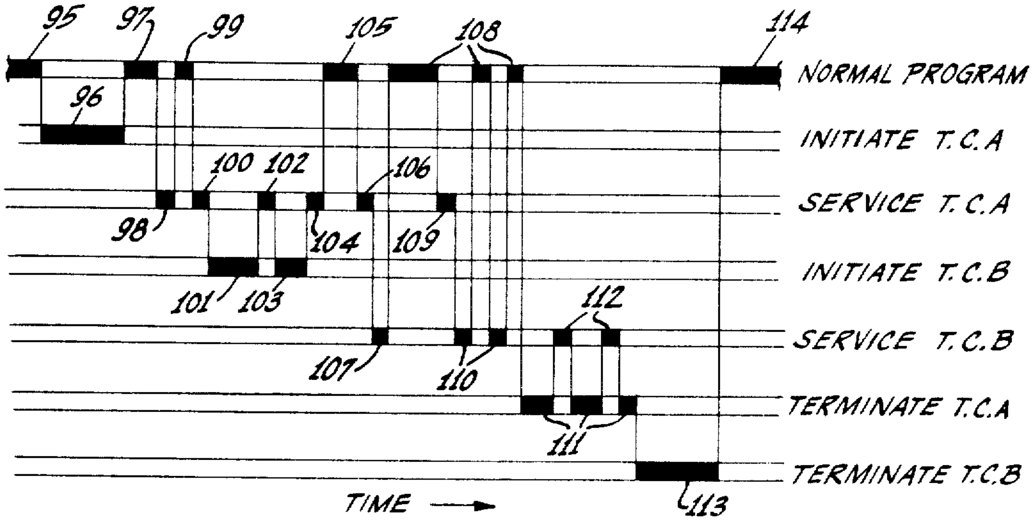
FIGURE 2 is a time chart which will be referred to in explaining the operation of the system of FIGURES 1A and 1B.

The portion of the operation of the system which has thus far been described is the first part of the transfer channel initiation routine as represented by the bar 96 in the time chart of FIGURE 2. Now that the transfer channel A is in communication with the data processor 10, an initiation routine continues until the transfer channel is made ready for the actual transfer of data words between one of the peripheral devices connected to the transfer channel and the data processor 10. This initiation routine, as illustrated at 96 in the time chart of FIGURE 2, interrupts the normal program 95 of the data processor until the initiation program is completed, at which time the normal program is resumed during the time 97.

Following the completion of the initiation program in transfer channel A, circuits (not shown) in the transfer channel supply a signal to the input 42 of the ready-for-service gate 40. Thereafter, upon the occurrence of a timing pulse over branch control bus 22A and line 41, the ready-for-service gate 40 is enabled and it sets flip-flop 38 to provide a "ready" signal on "ready" line *a*. The timing pulse applied from the control bus 20 to the ready-for-service gate 40 in transfer channel A is also simultaneously applied to corresponding gates 40 in transfer channels B and C. However, the gates 40 in channels B and C, at the stage of operation being described, have not indicated a readiness for service.

The "ready" signal on line *a* is coupled through the connected plug-in 59, the priority selector 60 to decoder 64. The binary number signal for channel A on lead 65 is then gated, by gates 68 in response to a timing signal over line 69, to the register 82 for the number of the transfer channel which is ready for service or is being serviced. Thereafter, the gates 86 are enabled, as a result of the triggering of flip-flop 90, so that the number signal of transfer channel A is passed over the transfer channel address line 50 to the decoder 52 which enables gates 56 and 58.

Meanwhile, the number signal in the register 82 has been applied over line 89 to the address generator 11 in the data processor 10. The address generator 11 supplies an appropriate memory address to the register 12 which contains an instruction used in executing the transfer of one data word between the data processor 10 and one of the peripheral devices of the group 25A of such devices connected to transfer channel A. The communication passes through enabled gates 56 and/or 58 and switch 24A. This transfer of a data word to or from a peripheral device connected to transfer channel A is represented in FIGURE 2 at 98 and it constitutes one unit of service of the transfer channel.

The data processor 10 then returns to a unit of its normal program as represented at 99 in FIGURE 2. Thereafter, the ready-for-service gate 40 is again enabled by inputs 41 and 42 to provide a ready signal over line *a* which passes successively through the connection plug-in 59, the priority selector 60, the coder 64, and gates 68 to the register 82. The gates 66 are not enabled at this time due to the absence of a signal on line 64, indicating that the transfer channel is still being serviced. The number signal from register 82 divides going in one path through gates 86, transfer channel address line 50 and decoder 52 to enable gates 56 and 58, and going through the other path 89 to the address generator 11 of data processor 10. Thereupon, another information word is transferred between the data processor and the transfer channel as represented at time 100 in FIGURE 2.

It is assumed at this point that the normal program, such as at time 99, has included an interrogation of transfer channel B and that the ready-for-initiation gate 30 in transfer channel B has indicated a readiness for initiation over the "ready" line *b*. This readiness signal acts through the plug-in 59, the priority selector 60, the coder 64, the gates 66, the register 80, the gates 84, the transfer channel address line 50 and the decoder 52 in transfer channel B to enable the gates 56 and 58 in transfer channel B. The number signal from register 80 also is applied to address generator 11 of the data processor to address a predetermined portion of the memory 13. This memory portion may store a subroutine of instructions used to service transfer channel B. The communication thus established between the data processor 10 and the transfer channel B performs a portion 101 (FIGURE 2) of the program for the initiation of transfer channel B. This program is interrupted at 102 for the purpose of transferring another information word between transfer channel A and the data processor 10.

The scheme followed is one wherein the initiation or termination of a transfer channel takes precedence over the normal program of the data processor 10, and wherein the servicing of a transfer channel (the transfer of one data word) takes precedence over both the initiation program and the normal program. The priority scheme also requires that the initiation of one transfer channel be completed before the initiation of another transfer channel is begun.

Following the service at time 102 of transfer channel A, the system returns to and completes the initiation of transfer channel B during time 103, the flow of control signals in the "ready" line *b* and the transfer channel address line 50 being the same as that described with reference to time 101. Thereafter, another information word is transferred to or from transfer channel A at the time 104, and then the data processor returns to the normal program at time 105, the flow of signals being as has been previously described.

The normal program at time 105 is interrupted for the purpose of servicing one of the transfer channels A and B, both of which are assumed to be ready to communicate with the data processor 10. In this situation, both of the ready lines *a*, *b* are energized and are connected through the connection plug-in 59 to the priority selector 60. It has been assumed that transfer channel A has been assigned a higher priority than transfer channel B. Therefore, solely the output $a''$ of the priority selector 60 is energized so that the number signal of transfer channel A is supplied at the selector output 65. Therefore, one information word is transferred to or from transfer channel A at time 106. Thereafter, since the transfer channel A is not immediately ready to transfer another information word, an information word transfer is made to or from transfer channel B at time 107.

It is then assumed that the data processor 10 returns to the normal program at times 108 which are interrupted at time 109 to transfer the last information word to or from transfer channel A, and is interrupted at times 110 to transfer two additional words to or from transfer channel B.

Now that all of the information words desired have been transferred to or from transfer channel A, circuits (not shown) in transfer channel A supply an enabling signal to the ready-for-termination gate 44. On the occurrence of a timing signal on line 45, the gate 44 is enabled and its output sets flip-flop 38. The flip-flop supplies a "ready" signal over line *a* which is effective through the path including register 80 in the same manner as has been described in connection with the initiation of transfer channel A. The signal from the register 80 is simultaneously applied to the data processor 10 to cause a communication with the transfer channel A which carries out a termination routine in transfer channel A at times 111. The termination procedure for transfer channel A is interrupted whenever necessary for transferring final data words to or from transfer channel B at times 112. After termination of the higher priority transfer channel A is completed, the program for termination of transfer channel B is performed at time 113. Thereafter, the data processor 10 resumes its normal program at time 114.

What is claimed is:

1. The combination of a data processor, a plurality of peripheral device transfer channels each coupled over a common multi-conductor signal bus to said data processor, a transfer channel priority selector and coder means associated with said data processor, operational readiness indicating means in each transfer channel coupled over respective "ready" lines to respective inputs of said priority selector and coder means, whereby the output of the priority selector and coder means is a coded number signal corresponding to the highest priority one of the transfer channels providing an input to the selector and coder means, an individual transfer channel number signal decoder circuit in each transfer channel, means to couple said coded number signal from said selector and coder means over an address line to the number signal decoder circuits in all transfer channels, and gate means in each transfer channel responsive to the decoder circuit therein to condition the addressed transfer channel for communication over the signal bus with the data processor.

2. The combination of a data processor, a plurality of peripheral device transfer channels each coupled over a common multi-conductor signal bus to said data processor, a transfer channel priority selector and coder means associated with said data processor, operational readiness indicating means in each transfer channel coupled over respective "ready" lines to respective inputs of said priority selector and coder means, whereby the output of the priority selector and coder means is a coded number signal corresponding to the highest priority one of the transfer channels providing an input to the selector and coder means, an individual transfer channel number signal decoder circuit in each transfer channel, means to couple said coded number signal from said selector and coder means over an address line to the number signal decoder circuits in all transfer channels, gate means in each transfer channel responsive to the decoder circuit therein to condition the addressed transfer channel for communication over the signal bus with the data processor, and means to also apply said coded number signal from said selector and coder means to said data processor to program the information signals passed over the signal bus.

3. The combination of a data processor, a plurality of peripheral device transfer channels each including gate means for communication therethrough over a common multi-conductor signal bus with said data processor, a transfer channel priority selector, operational readiness indicating means in each transfer channel coupled to a respective input of said priority selector, whereby the priority selector provides an output on a lead corresponding with the highest priority one of the transfer channels providing an input to the selector, a coder coupled to the output of the priority selector to provide a coded number signal corresponding to the number of said highest priority one of the transfer channels providing an input to the selector, an individual transfer channel number decoder in each transfer channel, means to couple said coded number signal over an address line to the number decoders in all transfer channels, and means in each transfer channel to couple the output of the decoder therein to said gate means therein to condition a selected transfer channel for communication over the signal bus with the data processor.

4. The combination of
a data processor,
a plurality of peripheral device transfer channels each including gate means for communication therethrough over a common multi-conductor signal bus with said data processor,
a transfer channel priority selector,
operational readiness indicating means in each transfer channel coupled to a respective input of said priority selector, whereby the priority selector provides an output on a lead corresponding with the highest priority one of the transfer channels providing an input to the selector,
a coder coupled to the output of the priority selector to provide a coded number signal corersponding to the number of said highest priority one of the transfer channels providing an input to the selector,
an individual transfer channel number decoder in each transfer channel,
means to couple said coded number signal over an address line to the number decoders in all transfer channels,
means in each transfer channel to couple the output of the decoder therein to said gate means therein to condition a selected transfer channel for communication over the signal bus with the data processor,
and means in said data processor and responsive to said transfer channel number signal to program the information signals passed over the signal bus.

5. The combination of
a centrally-located data processor,
a plurality of remotely-located peripheral device transfer channels each including gate means for communication therethrough over a common multi-conductor signal bus with said data processor,
a centrally-located transfer channel priority selector,
operational readiness indicating means in each transfer channel coupled to a respective input of said priority selector, whereby the priority selector provides an output on a lead corresponding with the highest priority one of the transfer channels providing an input to the selector,
a coder coupled to the output of the priority selector to provide a coded number signal corresponding to the number of said highest priority one of the transfer channels providing an input to the selector,
an individual transfer channel number decoder in each transfer channel,
means to couple said coded number signal over an address line to the number decoders in all transfer channels,
means in each transfer channel to couple the output of the decoder therein to said gate means therein to condition a selected transfer channel for communication over the signal bus with the data processor,
and means in said data processor and responsive to said transfer channel number signal to program the information signals passed over the signal bus.

6. The combination of
a data processor,
a plurality of peripheral device transfer channels each coupled over a common multi-conductor signal bus to said data processor,
a transfer channel priority selector,
a ready-to-be-controlled means and a ready-for-data-transfer means in each transfer channel, both of said means in each transfer channel having a common output coupled over a "ready" line to a respective input of said priority selector,
a coder coupled to the output of the priority selector to provide a coded number signal corresponding to the highest priority one of the transfer channels providing an input to the selector,
a register for the number of a transfer channel ready to be controlled,
a register for the number of a transfer channel ready for data transfer,
timed gating means between said coder and said registers to couple a coded number signal from the coder to the appropriate register,
an individual transfer channel number signal decoder in each transfer channel,
alternating means to couple the coded number signal in said two registers over an address line to the number signal decoders in all transfer channels,
gate means in each transfer channel responsive to the decoder therein to condition a selected transfer channel for communication over the signal bus with the data processor,
and means in said data processor and responsive to a transfer channel number from said registers to program control and data signals passed over the signal bus.

7. The combination of
a data processor,
a plurality of peripheral device transfer channels each coupled over a common multi-conductor signal bus to said data processor,
a transfer channel priority selector,
a ready-to-be-controlled means and a ready-for-data-transfer means in each transfer channel, both of said means in each transfer channel having a common output coupled over a "ready" line to a respective input of said priority selector,
a coder coupled to the output of the priority scanner to provide a coded number signal corresponding to the highest priority one of the transfer channels providing an input to the selector,
a register for the number of a transfer channel ready to be controlled,
a register for the number of a transfer channel ready for data transfer,
gate means between said coder and said registers,
timing means operative over said signal bus on said gate means and said ready-to-be-controlled means and ready-for-data-transfer means to couple a coded number signal from the coder to the appropriate register,
an individual transfer channel number signal decoder in each transfer channel,
alternating means to couple the coded number signal in said two registers over an address line to the number signal decoders in all transfer channels, and
gate means in each transfer channel responsive to the decoder therein to condition a selected transfer channel for communication over the signal bus with the data processor.

8. The combination of
a data processor,
a plurality of peripheral device transfer channels each coupled over a common multi-conductor signal bus to said data processor,
a transfer channel priority selector associated with said data processor,
a ready-for-initiation means, a ready-for-termination means and a ready-for-data-transfer means in each transfer channel, all three of said means in each transfer channel having a common output coupled over a "ready" line to a respective input of said priority selector,
a coder coupled to the output of the priority selector to provide a coded number signal corresponding to the highest priority one of the transfer channels providing an input to the selector,
a register for the number of a transfer channel ready to be initiated or terminated,
a register for the number of a transfer channel ready for data transfer,
timed gating means between said coder and said registers to couple a coded number signal from the coder to the appropriate register, an individual transfer channel number signal decoder in each transfer channel,
alternating means to couple the coded number signals in said two registers over a common address line to the number signal decoders in all transfer channels, and
gate means in each transfer channel responsive to the decoder therein to condition a selected transfer channel for communication over the signal bus with the data processor.

9. The combination of
a data processor,
a plurality of peripheral device transfer channels each coupled over a common multi-conductor signal bus to said data processor,
a transfer channel priority selector associated with said data processor,
a ready-for-initiation means, a ready-for-termination means and a ready-for-data-transfer means in each transfer channel, all three of said means in each transfer channel having a common output coupled over a "ready" line to a respective input of said priority selector,
a coder coupled to the output of the priority selector to provide a coded number signal corresponding to the highest priority one of the transfer channels providing an input to the selector,
a register for the number of a transfer channel ready to be initiated or terminated,
a register for the number of a transfer channel ready for data transfer,
timed gating means between said coder and said registers to couple a coded number signal from the coder to the appropriate register,
an individual transfer channel number signal decoder in each transfer channel,
alternating means to couple the coded number signals in said two registers over a common address line to the number signal decoders in all transfer channels,
gate means in each transfer channel responsive to the decoder therein to condition a selected transfer channel for communication over the signal bus with the data processor,
and means in said data processor and responsive to a transfer channel number from said registers to program control and data signals passed over the signal bus.

10. The combination of
a data processor,
a plurality of peripheral device transfer channels each coupled over a common multi-conductor signal bus to said data processor,
a transfer channel priority selector,
a ready-for-initiation means, a ready-for-termination means and a ready-for-data-transfer means in each transfer channel, all three of said means in each transfer channel having a common output coupled over a "ready" line to a respective input of said priority selector,
a coder coupled to the output of the priority selector to provide a coded number signal corresponding to the highest priority one of the transfer channels providing an input to the selector,
a register for the number of a transfer channel ready to be initiated or terminated,
a register for the number of a transfer channel ready for data transfer,
gate means between said coder and said registers,
timing means operative over said signal bus on said gate means and said ready means to couple a coded number signal from the coder to the appropriate register,
an individual transfer channel number signal decoder in each transfer channel,
alternating means to couple the coded number signals in said two registers over a common address line to the number signal decoders in all transfer channels,
gate means in each transfer channel responsive to the decoder therein to condition a selected transfer channel for communication over the signal bus with the data processor,
and means in said data processor and responsive to a transfer channel number from said registers to program control and data signals passed over the signal bus.

11. The combination of
a data processor,
an associated transfer channel selector and coder means having individual inputs for a plurality of transfer channels and having an output providing a coded transfer channel number signal corresponding to the highest priority one of its inputs,
a plurality of peripheral device transfer channels each coupled over a common multi-conductor signal bus to said data processor,
a first individual transfer channel number signal decoder in each transfer channel having an input coupled over said signal bus to said data processor,
operational readiness indicating means in each transfer channel,
gate means in each transfer channel responsive to said operational readiness indicating means therein and to the output of said first transfer channel number signal decoder to supply a signal over a respective "ready" line to said inputs of said transfer channel selector and coder means,
a second individual transfer channel number signal decoder in each transfer channel,
a transfer channel address line coupling the output of said transfer channel selector and coder means to the second number signal decoders in all of the transfer channels, and
gates in each transfer channel selectively enabled by the output of the respective second number signal decoder therein to permit communication over said signal bus between the transfer channel and said data processor.

12. The combination of
a data processor,
an associated transfer channel selector and coder means having individual inputs for a plurality of transfer channels and having an output providing a coded transfer channel number signal corresponding to the highest priority one of its inputs,
a plurality of peripheral device transfer channels each coupled over a common multi-conductor signal bus to said data processor,
a first individual transfer channel number signal decoder in each transfer channel having an input coupled over said signal bus to said data processor,
operational readiness indicating means in each transfer channel,
gate means in each transfer channel responsive to said operational readiness indicating means therein and to the output of said first transfer channel number signal decoder to supply a signal over a respective "ready" line to said inputs of said transfer channel selector and coder means,
a second individual transfer channel number signal decoder in each transfer channel,
a transfer channel address line coupling the output of said transfer channel selector and coder means to the second number signal decoders in all of the transfer channels,
gates in each transfer channel selectively enabled by the output of the respective second number signal decoder therein to permit communication over said signal bus between the transfer channel and said data processor, and
means coupling the output of said transfer channel selector and coder means also to said data processor to program the information signals passed over said signal bus.

References Cited by the Examiner

UNITED STATES PATENTS

| | | | |
|---|---|---|---|
| Re. 25,599 | 6/1964 | Tate | 340—172.5 |
| 2,840,705 | 6/1958 | Scully | 340—172.5 |
| 3,029,414 | 5/1962 | Schrimpf | 340—172.5 |
| 3,061,192 | 10/1962 | Terzian | 340—172.5 |
| 3,099,818 | 7/1963 | Murray | 340—172.5 |
| 3,200,380 | 8/1965 | MacDonald et al. | 340—172.5 |
| 3,208,048 | 9/1965 | Kilburn et al. | 340—172.5 |

ROBERT C. BAILEY, *Primary Examiner.*

P. J. HENON, *Assistant Examiner.*